Jan. 6, 1925.
R. E. NOBLE
1,521,788
MINING MACHINE
Filed Dec. 17, 1919    5 Sheets-Sheet 1
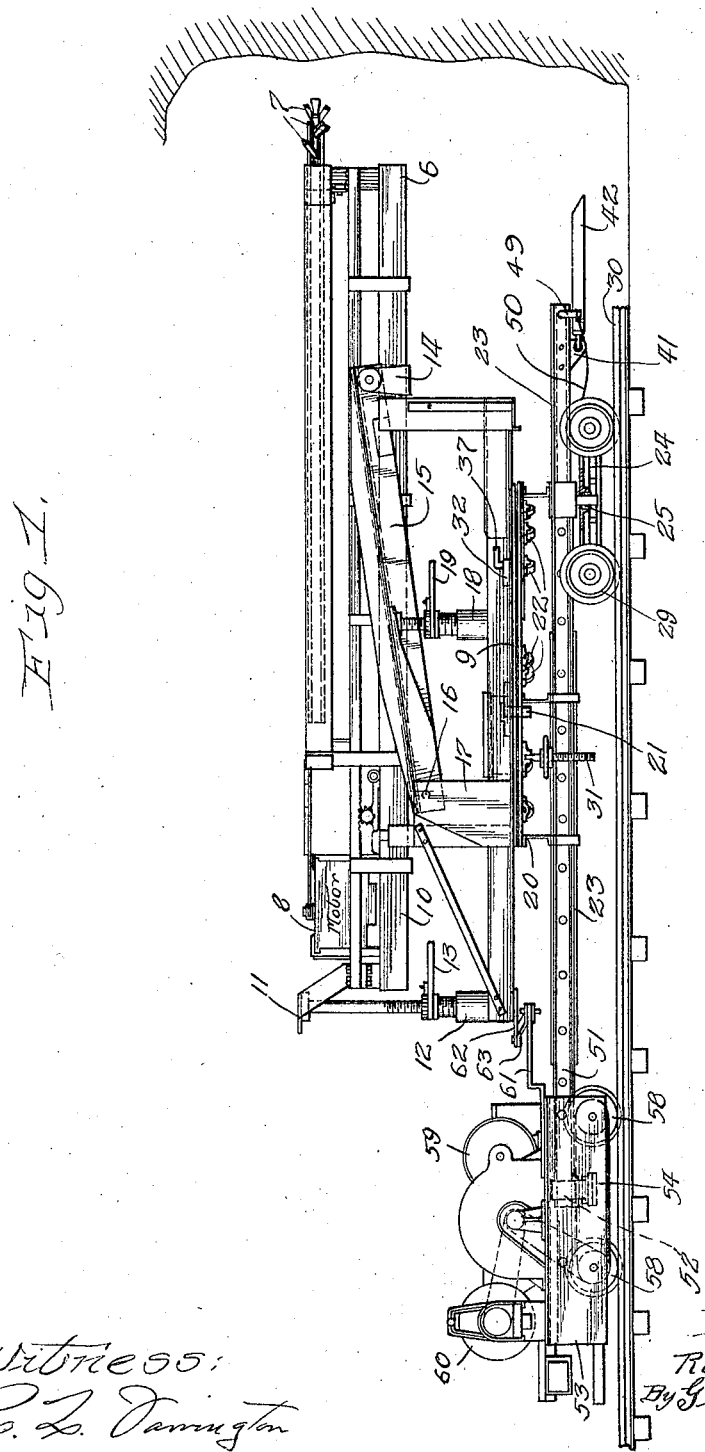

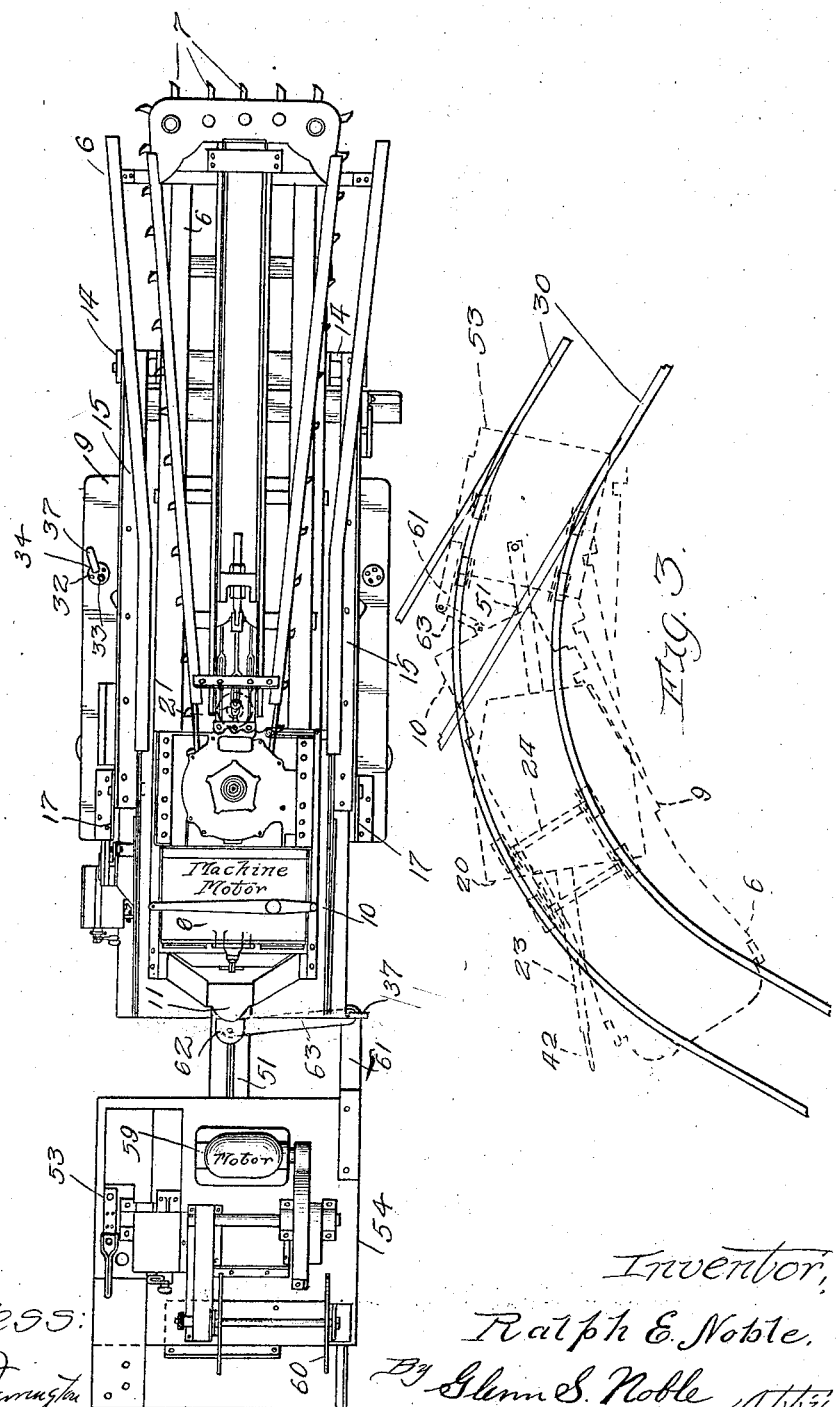

Jan. 6, 1925.  1,521,788
R. E. NOBLE
MINING MACHINE
Filed Dec. 17, 1919   5 Sheets-Sheet 3

Witness:
Inventor,
Ralph E. Noble,
By Glenn S. Noble
Atty.

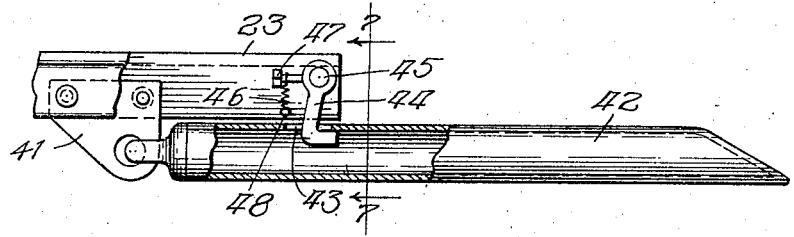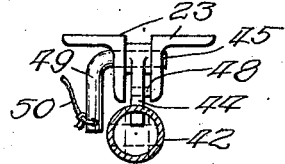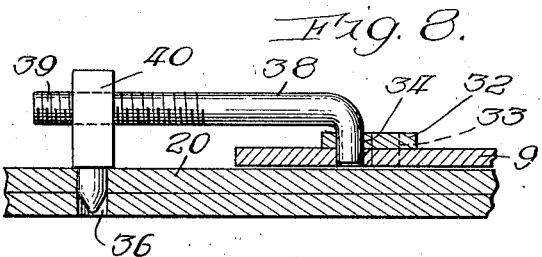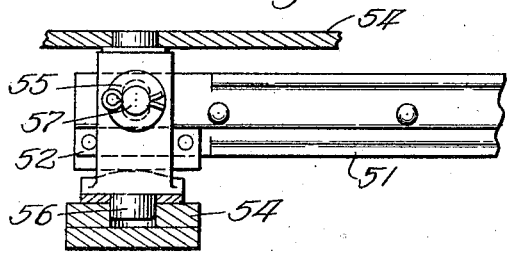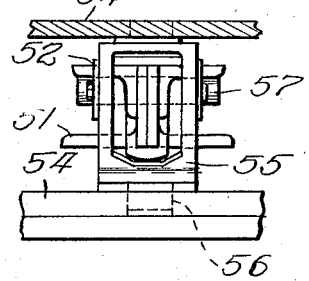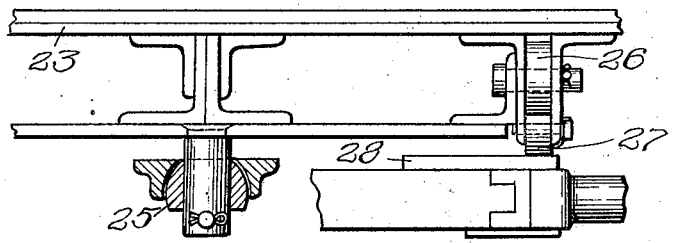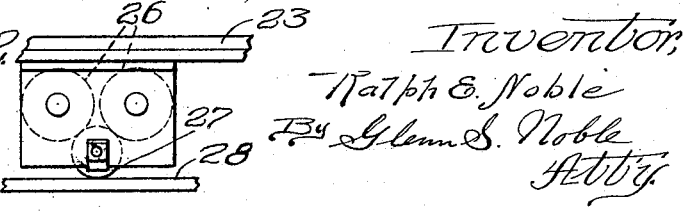

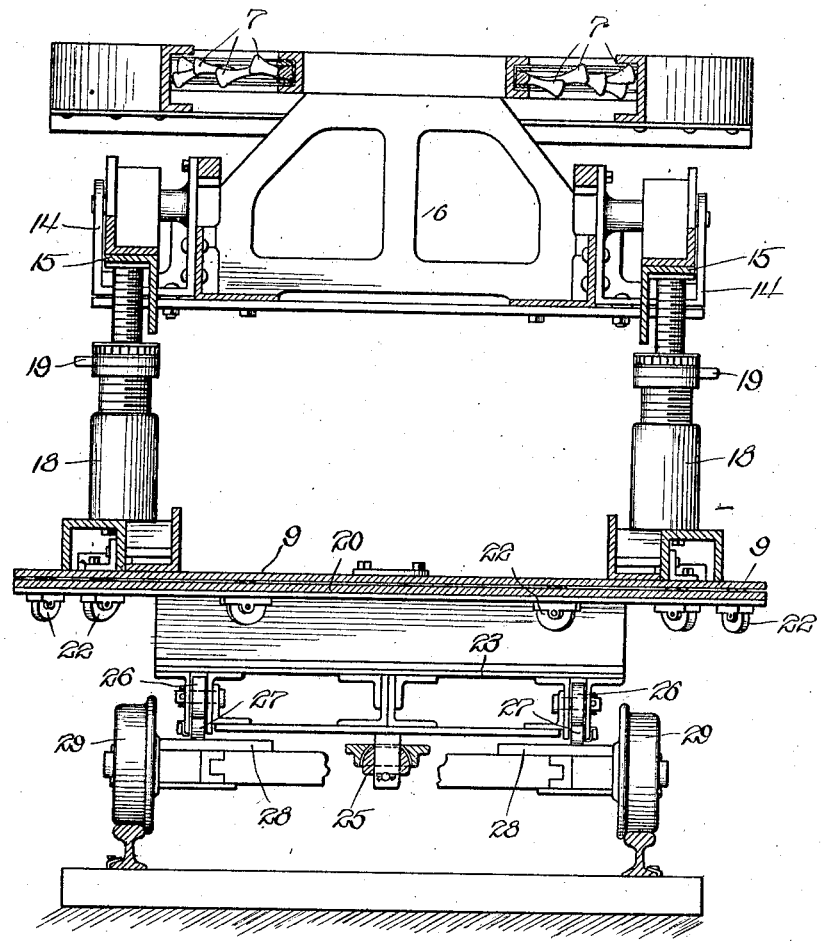

Patented Jan. 6, 1925.

1,521,788

UNITED STATES PATENT OFFICE.

RALPH E. NOBLE, OF CHICAGO, ILLINOIS, ASSIGNOR TO MORGAN GARDNER ELECTRIC COMPANY, OF CHICAGO, ILLINOIS.

MINING MACHINE.

Application filed December 17, 1919. Serial No. 345,527.

*To all whom it may concern:*

Be it known that I, RALPH E. NOBLE, a citizen of the United States, residing at Chicago, in the county of Cook and State of Illinois, have invented certain new and useful Improvements in Mining Machines, of which the following is a specification.

This invention relates to machines for cutting kerfs in coal or other material and is particularly applicable to cutter chain machines of the "breast" type. In machines of this character the cutting operation is performed by successive reciprocating movements of the cutter chain frame, and this invention provides means whereby a machine or apparatus of this character may be mounted so that it may be swung in a horizontal plane to cut in any desired direction from a main support or make a succession of radial cuts; and may also be raised and lowered and adjusted in a vertical plane in order to make the cuts at any desired height or angle.

Another important feature of the present invention is the provision of means whereby the machine may be removed from place to place and may be swung automatically to regulate the position of same on the supporting truck while passing around curves as in narrow passage-ways or workings.

The objects of this invention are to provide a new and improved type of mining apparatus; to provide a mining machine of the breast type which may be moved vertically and horizontally on a suitable support; to provide a self-propelling mining apparatus which will pass around comparatively short curves and through narrow openings although being of considerable length; and in general to provide such an improved construction as will appear more fully from the following specification.

In the accompanying drawings illustrating this invention:

Figure 1 is a side view of a machine embodying the principal features thereof;

Figure is a plan view;

Figure 3 is a diagrammatic view showing the action of the machine in moving around a curve;

Figures 6 and 7 are details of a sprag or brace;

Figure 8 is an enlarged side view of the adjustable locking device;

Figures 9 and 10 are details of a swivel joint; and

Figures 11 and 12 are details of the devices for supporting the frame on the truck.

Figure 13 is a cross sectional view taken through the central part of the machine.

Figure 4:
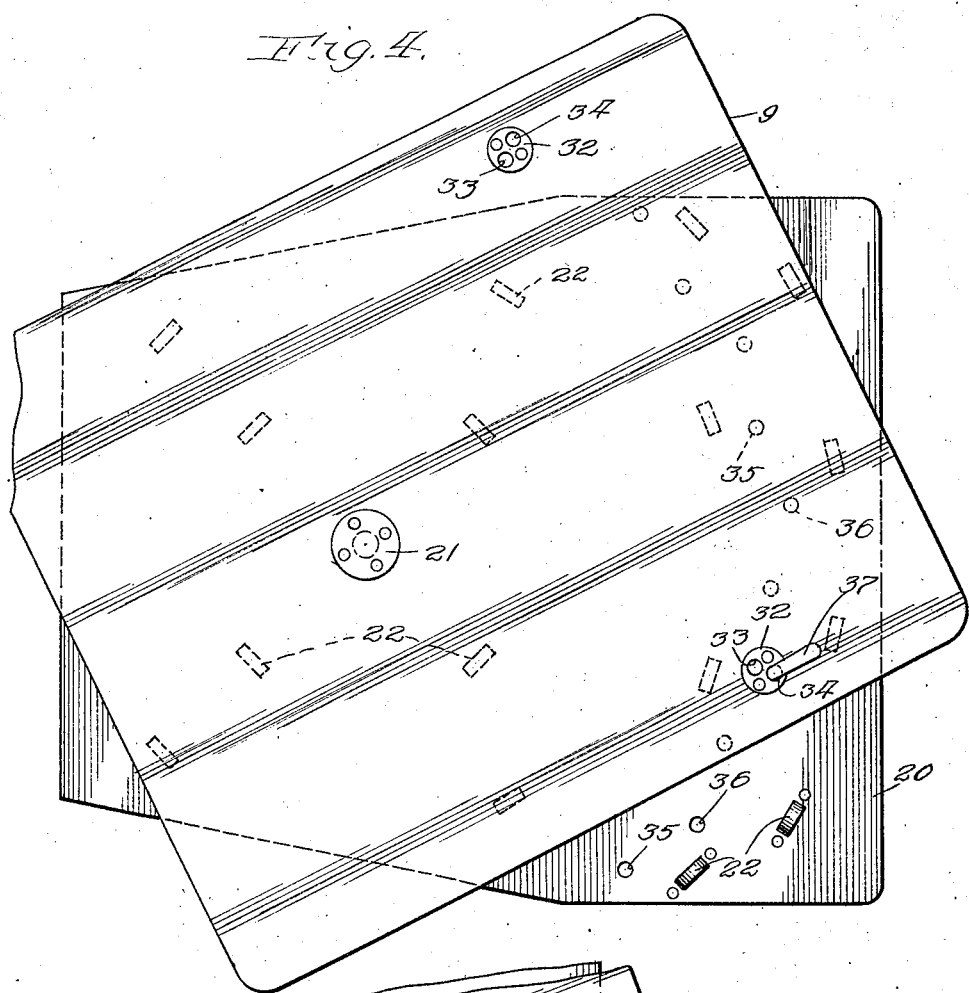
Figure 4 is a diagrammatic view of the turn-table showing the arrangement for locking same in adjusted position.

As illustrated in these drawings, 6 represents a mining machine of the breast type having a cutter chain 7, and an operating motor 8. This machine may be of any ordinary or preferred form of construction, but as the details thereof form no part of this invention, further description will not be necessary.

This machine is adjustably mounted on a turn-table or platform 9. The frame 10 of the machine is provided at the rear end with an arm or bracket 11 which is supported on a jack 12 on the rear end of the turn-table 9. Any suitable form of jack may be utilized but I have shown a screw jack which is operated by a ratchet handle 13.

The forward end of the frame 10 is carried on a yoke or cross-piece 14 which is pivotally connected to the front ends of levers 15 arranged on either side of machine. The rear ends of the levers are pivoted at 16 to plates or brackets 17 on the turn-table 9. Jacks 18 are positioned on either side of the turn-table under the adjacent portions of the levers 15, these jacks being operated by means of handles 19. It will be seen that, when the jacks 18 are raised or lowered, the forward ends of the levers 15 will have a correspondingly multiplied movement so that the front end of the machine may be raised or lowered a considerable distance with a small movement of the jacks.

The turn-table 9 is rotatably mounted on a platform 20, being pivoted thereto at 21, and the platform is preferably provided with anti-friction rollers 22 so that the machine may be easily swung in a horizontal direction. This platform is carried on, or forms a part of a vehicle frame 23. The forward end of the vehicle frame is supported on a truck 24, and is preferably connected thereto by means of a ball joint swivel 25, so that the truck may have comparatively free action with respect to the frame. The vehicle frame is supported at the sides by anti-friction wheels or rollers 26, 27 which rest on plates 28 at the sides of the truck as shown in Figures 11 and 12. The truck 24 is provided with wheels 29 which run on the track 30. The platform 20 is preferably provided at either side with steady jacks 31 which are adapted to be used with the usual pipe extensions (not shown).

It will be noted that when the turn-table 9 is rotated to adjust the position of the machine for making a cut, it will be necessary to have some means of locking the table in adjusted position. The turn-table is provided with pin sockets or bearings 32 each having two holes 33 and 34 which also extend through the turn-table. The holes 33 are nearer the center of the turn-table than the holes 34, and register with a series of holes 35 in the platform 20. The holes 34 are adapted to register with a series of holes 36 in the platform 20, the holes 35 and 36 being spaced or in staggered relation to each other. Pins 37 are adapted to be inserted through the holes in the turn-table and platform, for holding the parts in adjusted position. The holes 35 and 36 are positioned to give the usual amount of circumferential movement of the machine for making the successive cuts and the operation of this arrangement will be readily understood from Figure 4. The pin 37 is shown as being inserted in the hole 34 and engaging with one of the holes 36. When the operator desires to swing the machine to the next position, he removes the pin from the hole 34 and inserts it in the hole 33 at which time it will ride on the surface of the platform 20. Then as he swings the turn-table, the pin is in position to register with the next hole 35 and will drop into this hole when arriving at the next cutting position for the machine. It will be noted that this step by step movement may be continued for the successive cuts and the machine may be operated from either side.

Figure 5:
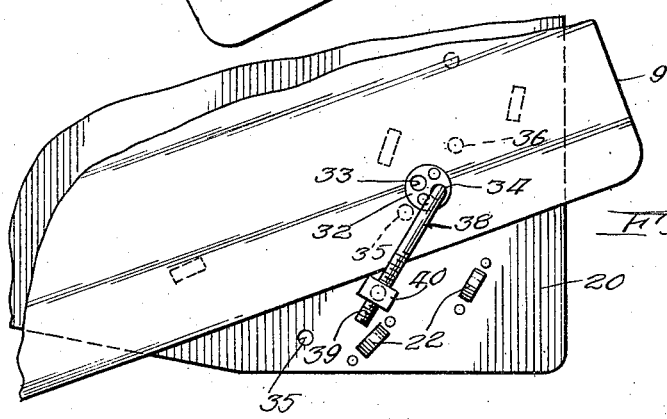
Figure 5 is a detail of an adjustable locking device.

In some instances it may be desirable to make a cut without swinging the machine the full distance between two of these holes, or to adjust the machine a short distance from one of such positions. For this purpose I provide an adjustable locking device as shown in Figures 5 and 8. This comprises a pin or rod 38 which is bent at one end to engage with the holes 33 or 34 and threaded at the opposite end 39 for engagement with the correspondingly threaded hole in the plug or pin 40 which is adapted to engage with any of the holes 35 or 36. It will be readily seen that by adjusting the plug 40 on the rod 38, the distance between the holes engaged by these parts may be varied so as to hold the mining machine in adjusted position.

The forward end of the frame 23 has a lug or projection 41, to which is jointed a sprag or brace 42. This brace is preferably formed of tubing and has a slot 43 in the upper side for engagement with a catch 44 which is secured to a rod or pin 45 rotatably mounted in the end of the frame 23. This catch is held in engaging position by a spring 46 which is secured at one end to a pin 47 in the rod 45, and at the other end to a pin 48 in the frame. One end of the rod 45 is bent to form an arm 49 for swinging the rod and catch. This arm may be swung by hand or a cord 50 may be attached thereto, and carried to some convenient part of the machine, as at the rear end thereof, so that the operator may release the catch and drop the sprag at any desired time.

The vehicle frame 23 has a beam or reach rod 51 extending rearwardly and connected by means of a swivel joint 52 to a propelling truck 53, the joint being formed as shown in Figures 9 and 10 so that truck frame 54 may oscillate horizontally and vertically with respect to the beam. This is accomplished by means of a yoke 55 carried by vertical pivots 56 which engage with bearings in the frame, this yoke having a horizontal pivot 57 which engages with a hole in the end of the beam 51.

The propelling truck is provided with driving wheels 58 which are driven by means of any suitable driving gearing from a propelling motor 59. This truck is also provided with controlling apparatus for controlling the motor and is preferably provided with a reel 60 for carrying an electric cable for supplying current to the motors.

It will be noted that by having a separate propelling truck, the apparatus may be made of comparatively small height so that the machine may be operated where there is but little head room. It will however, also be noted that the apparatus is of considerable length and one of the particularly novel features of the present invention is the arrangement whereby the machine may be swung automatically while passing around curves so that it will clear the side walls of the passage-way or workings. In order to do this, the propelling truck frame 54 has a forwardly projecting arm 61 rigidly secured thereto and the rear end of the turn-table 9 has a projection 62 which may be connected to the arm by means of a link 63. This link is pivoted to the projection 62 and its free end is normally disconnected from the arm 61, but may be pivoted thereto by means of one of the pins 37.

When the machine is to be operated, it is moved up to the face of the coal and the supporting portion may be steadied by means of the jacks and brace shown, as well as by means of other jacks commonly employed for such purposes. The mining machine itself is then brought to the desired height and position by means of the jacks 12 and 18 and the cut is made in the usual manner by reciprocating the cutter frame or arm. When the cutter chain frame has been retracted, the machine is swung in a horizontal direction preparatory for the next cut which is then made, and by continuing this operation a kerf may be formed across the entire face of the coal.

When the machine is to be moved to another room or entry, the pin 37 is inserted through the link 63 and arm 61 so that the turn-table 9 will be swung on its center as the trucks pass around a curve. The arrangement is such that the turn-table with the machine carried thereby will be held at all times at approximately a tangent to the curve so that it will project the least possible amount over the track.

It will be noted that various changes may be made in the arrangement of the parts and details of construction, in order to adapt my improved apparatus to different mining conditions and therefore I do not wish to be limited to the exact arrangement above described, except as specified in the following claims in which I claim:

1. A mining apparatus comprising a propelling truck, a trailer truck, a vehicle frame pivotally mounted on said trailer truck and connected to the propelling truck by a swivel connection, a turn-table on said vehicle frame, and a mining machine adjustably mounted on said turn-table.

2. A mining apparatus comprising a propelling truck, a carrier truck, a frame supported by said trucks, a turn-table mounted on said frame, and a breast cutter chain machine adjustably mounted on said turn-table.

3. A mining machine construction comprising a self propelling truck, a second truck, a frame pivotally mounted on said second truck, a swivel joint connection between said frame and the propelling truck, a turn-table mounted on said frame, and means connecting said turn-table and propelling truck whereby the turn-table will be swung when the apparatus is moving around a curve.

4. In an apparatus of the character set forth, the combination of two trucks, an articulated connection between the trucks, a support rotatably mounted on one of said trucks, and means for connecting the support with the other truck whereby the support will be rotated when the trucks pass around a curve.

5. In a mining machine construction, the combination of a truck having track wheels, a frame, a universal joint connection between the frame and truck, a self propelling truck having track wheels, an arm from said frame, a swivel joint connection between said frame and the self propelling truck, an arm projecting from said self propelling truck, a turn-table on said frame, and a link for connecting the front end of the turn-table with said last mentioned arm whereby the turn-table will be rotated when the trucks are passing around a curve.

6. The combination of a frame, a breast machine, a cross piece, levers pivotally connected to said cross piece at the forward ends thereof and pivotally connected to the frame at the rear ends thereof, and jacks between said levers and frame for swinging the forward ends of the levers.

7. In an apparatus of the character set forth, the combination of a frame, a truck for supporting one end of said frame, a self propelling truck for supporting the other end of the frame, jointed connections between the frame and trucks, a horizontally rotatable frame mounted on said first named frame, a connection between the rotatable frame and the self propelling truck whereby the rotatable frame may be held in predetermined relation to the track on which the apparatus moves, a breast machine mounted on said rotatable frame, and adjusting means for adjusting the machine vertically, substantially as described.

RALPH E. NOBLE.